United States Patent [19]

Tulip

[11] Patent Number: 5,091,911
[45] Date of Patent: Feb. 25, 1992

[54] LONG WAVELENGTH NDYAG LASER

[75] Inventor: John Tulip, Edmonton, Canada

[73] Assignee: Carl Zeiss Stiftung, Fed. Rep. of Germany

[21] Appl. No.: 691,695

[22] Filed: Apr. 26, 1991

Related U.S. Application Data

[63] Continuation-in-part of Ser. No. 933,103, Nov. 20, 1986, Pat. No. 5,048,034.

[51] Int. Cl.⁵ ................................. H01S 3/30
[52] U.S. Cl. .......................... 372/4; 372/23; 372/99; 372/41
[58] Field of Search ............. 372/4, 40, 23, 99, 41

[56] References Cited

U.S. PATENT DOCUMENTS 4,371,965  2/1983  Lempicki et al. ............... 372/40
5,048,034  9/1991  Tulip ............................... 372/41

Primary Examiner—William L. Sikes
Assistant Examiner—Stephen W. Barns
Attorney, Agent, or Firm—Andrus, Sceales, Starke & Sawall

[57] ABSTRACT

A neodymium laser provides output at about 1.44 μm, by selection of a neodymium doping level of between about 0.3 and 0.7N, preferably at 0.4N with reflectivity of the output mirror at about 90% for 1.44 μm output. Selection of the reflectivity of the output mirror is adjusted to ensure that the excess of the gain over the absorption and transmission losses is maximized.

2 Claims, 1 Drawing Sheet

LONG WAVELENGTH NDYAG LASER

CROSS-REFERENCE TO RELATED APPLICATIONS

This application is a continuation-in-part of my copending application Ser. No. 06/933,103 filed Nov. 20, 1986 now U.S. Pat. No. 5,048,034.

FIELD OF THE INVENTION

This invention relates to long wavelength neodymium lasers for use in medical applications.

BACKGROUND AND SUMMARY OF THE INVENTION

The problem of increasing output of neodymium lasers, particularly at specific wavelengths such as 1.44 µm, is a difficult and much studied problem.

In the design of neodymium lasers having output in the wavelength range near 1.44 µm (about 1.4–1.5 µm, corresponding to radiation resulting from the transition $^4I_{9/2} \rightarrow {}^4I_{5/2}$, the actual wavelength of the output being variable depending on the host medium), several factors affect the power output. These include the length (L) and diameter (D) of the host crystal, the level of doping (N) of the host crystal with neodymium, the intensity of the excitation applied to the crystal and the reflectivity (R) of the mirrors defining the optical cavity.

As an example of the difficulties in increasing the power, arbitrarily increasing the intensity of the excitation applied to the crystal increases thermal lensing within the crystal, with a resulting degradation of the output beam. Further, while the gain of the laser is dependent on L (gain is proportional to $e^L$), it is difficult to grow longer crystals, and in any event the expense of growing longer crystals (larger than 15 cm) is not worthwhile since radiation at 1.06 µm is difficult to suppress with increasing L. In addition, the NdYAG laser is self-absorbing at 1.44 µm, hence increasing L tends to increase the self-absorption.

Similarly, increasing the diameter D of the crystal does not in general yield increased power, since increased D results in thermal lensing and uneven pumping.

Neodymium lasers are usually operated with a neodymium level of 1N, where N (for Normal) is defined as a doping level of 1.1% neodymium by weight of the host crystal. This level is determined by the optimum level of luminescence of the output of a neodymium laser as the neodymium concentration varies. A graph showing the dependence on neodymium concentration of the luminescence at 1.06 µm for a neodymium laser is shown in *Laser Crystals*, by Alex A. Kaminskii, Springer, at page 330. The luminescence peaks at the 1.1% concentration level, and decreases fairly rapidly below doping levels of about 0.7N to about half the maximum for a doping level of about 0.3N.

For a NdYAG laser with a given N, the reflectivity R of the output mirror is normally chosen according to the Rigrod model, which is a standard and well known model. In this model, the lasing threshold is determined as the level at which the lasing gain equals the combined losses due to absorption in the host crystal and transmission through the output mirror. Normal operation of the laser is then carried out at about five times the threshold. Since increasing N increases the absorption for output near 1.44 µm, without sufficiently increasing the gain, an increase of N increases the lasing threshold. This, in combination with the limiting factors on crystal size and the applied excitation, has previously been considered to eliminate the neodymium crystal as a host medium for a laser producing output at 1.44 µm.

As described in my U.S. Pat. No. 5,048,034, I have achieved satisfactory output from a neodymium laser at about 1.44 µm by pulsing the excitation applied to the host crystal, and using discriminatory optics that discriminate against the 1.06 µm radiation. This was a surprising result in that this line of output of the neodymium laser was considered too weak to provide useful power. This output was achieved using an output mirror having reflectivity of about 80% at 1.44 µm and a host crystal with neodymium doping of 1N.

I have also discovered that operating the laser with a neodymium doping level between 0.3N and 0.7N, yields surprisingly higher output, particularly when the doping level is about 0.4N and the reflectivity of the output mirror is about 90%, rather than the 80% that is predicted by the Rigrod model.

In one aspect, therefore my invention provides a long wavelength neodymium laser, comprising:

a housing including a reflective hollow optical cavity;

a laser rod mounted in said optical cavity, said laser rod composed of a crystalline or glass host structure having neodymium doping;

a pump lamp mounted in said optical cavity adjacent to said laser rod, said pump lamp providing a source of light for transfer to said laser rod;

drive means including circuit means for driving said pump lamp to produce intermittent pulses of light from said pump lamp;

wavelength selective resonator means for providing maximum reflection at 1.4 to 1.5 µm wavelength and minimum reflection at other wavelengths to allow laser oscillation in the range 1.4 to 1.5 µm; and the laser rod having a neodymium concentration level of between about 0.3 and 0.7N.

In a further aspect, the neodymium concentration is about 0.4N and the wavelength selective resonator means includes a mirror having reflectivity of about 90% at 1.44 µm.

BRIEF DESCRIPTION OF THE DRAWINGS

There will now be described a preferred embodiment of the invention, with reference to the drawing, by way of illustration, in which.

DETAILED DESCRIPTION OF PREFERRED EMBODIMENTS

Figure 1:
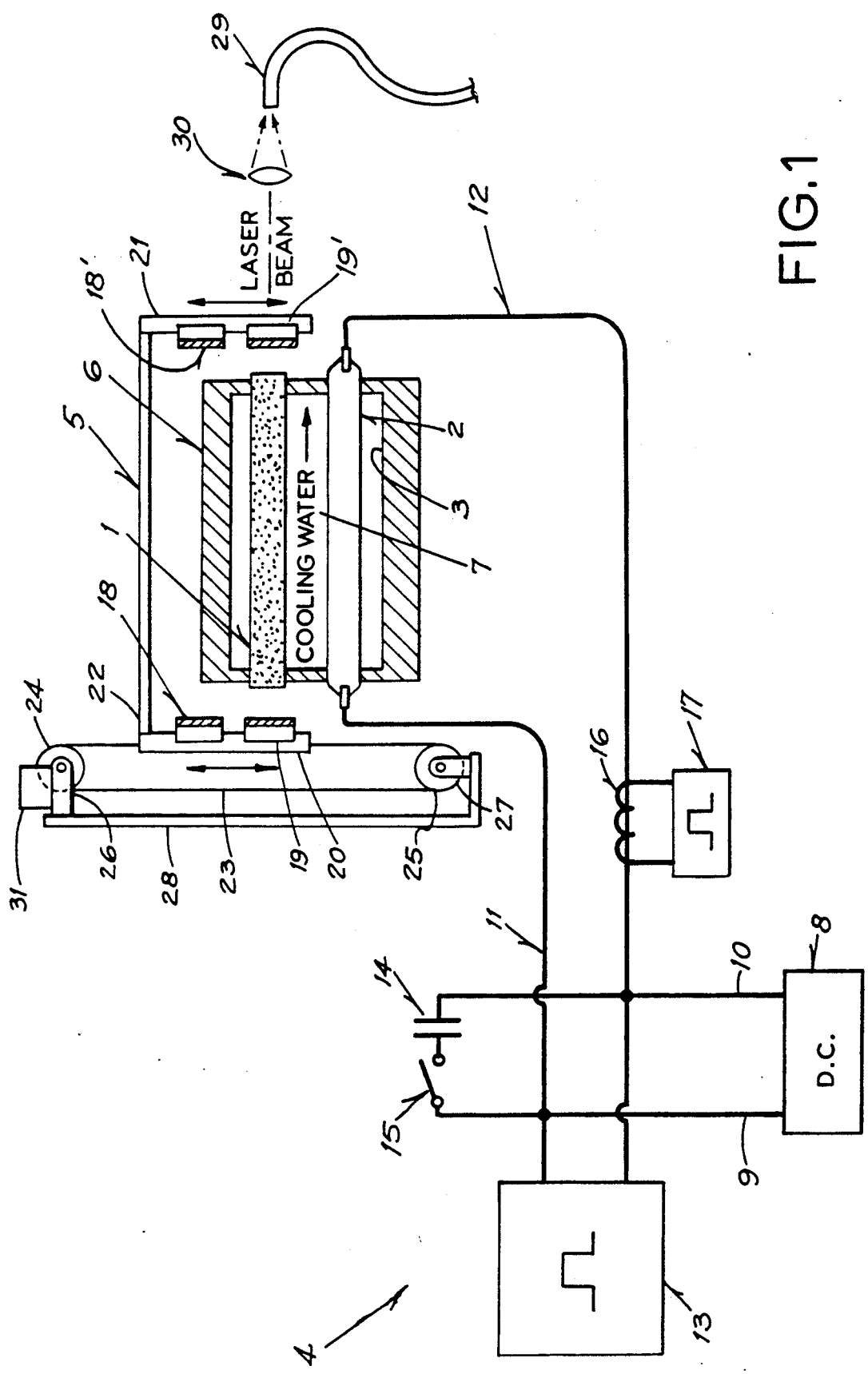
FIG. 1 is a schematic diagram of a NdYAG laser incorporating the principles of the present invention.

Referring now to FIG. 1, there is illustrated a NdYAG laser constructed to provide a beam of light at 1.44 µm wavelength to operate in a cutting mode, or alternately, to provide a beam of light at 1.06 µm wavelength to operate in a coagulating mode. As shown, the NdYAG laser includes a laser rod 1 and drive lamp 2 mounted within a laser cavity 3, a drive mechanism 4 for pulsing lamp 2 or alternately driving lamp 2 with a continuous output, and a mirror carousel 5.

Laser rod 1 is composed of a conventional NdYAG material having a doping of between about 3.3 and 6.6% (0.3 to 0.7N) by weight of the YAG host medium, preferably about 4.4% (0.4N). Conventional NdYAG material is composed of a triply-ionized neodymium ion, incorporated into a crystalline or glass host structure. The most common crystal host structure, and the one preferred for the composition of laser rod 1, is yttrium aluminum garnet, generally known by its acronym "YAG". YAG is a hard and brittle material which is a synthetic material having a garnet like structure and the chemical formula $U_3Al_5O_{12}$. Although YAG is the preferred crystalline host material for neodymium, alternatives to YAG that may be utilized for laser rod 1 are yttrium lithium fluoride, generally known as YLF, and yttrium aluminate, generally known at YALO. Additionally, since crystal growth problems limit the maximum length of YAG rods to about 10 centimeters for most practical applications, glass may also be utilized as the host structure for discs or rods of laser material which must be larger than standard YAG rods to provide higher output power and energy.

Laser rod 1 is preferably about 10 centimeters in length and about 0.7 centimeters in diameter. Opposite ends of rod 1 are polished and coated in the conventional manner for minimum reflectivity at a wavelength of approximately 1.06 and 1.32 $\mu$m. While it is known that it is desirable to utilize a laser rod 1 having minimum absorptivity of light, evidently if the absorption is too low, there is no power gain. At 1.44 $\mu$m wavelength absorptivity is 1% per centimeter for a NdYAG laser rod with $N=1$, and 0.4% for $N=0.4$ so that a 10 centimeter long rod placed within cavity 3 with $N=0.4$ will introduce a loss of about 8% into the laser resonator or mirrors. In the present invention it has been found that with N between 0.3 and 0.7, maximum power can be obtained.

Laser cavity 3 is formed within a reflective housing 6 of elliptical cross section thus forming an elliptical laser cavity 3. Housing 6 is composed of copper with a gold coating on its interior cavity surface to act as a lamp light reflector. Metal coated glass may also be used as a laser cavity. Lamp 2 used to "pump" the laser and laser rod 1 lie along the two foci of the elliptical interior shape of cavity 3, as is conventional. Water cooling of the laser rod and lamp is provided by flowing deionized water through tubes surrounding both rod 1 and lamp 2, and it is schematically illustrated in FIG. 1 by the arrow 7. These flow tubes may be of quartz or they may be of samarium doped glass. Cooling water of at least 4 gallons per minute is typically provided within cavity 3.

Several other types of cavity configurations are also possible for use with the present invention. As noted above, the preferred arrangement is to place the lamp 2 and rod 1 at the two foci of elliptical cavity 3, and let the geometric properties of the reflective elliptical cavity 3 carry the pump light from lamp 2 to rod 1. Another approach is to put lamp 2 next to rod 1 in a "close coupling" configuration wherein the rod and lamp are immediately adjacent each other in the center of a cylindrical reflective cavity. Additionally, two lamps and a rod can be put into a dual elliptical cavity, which in cross section looks like two overlapping ellipses with the lamps at the two foci of the housing and the rod at the focus they share.

Drive lamp 2 is preferably a krypton lamp (arc and flash) which has been found to be superior for laser action at 1.44 $\mu$m. Typically, lamp 2 has an internal diameter of 7 millimeters and a length of 10 centimeters. A lamp of these dimensions has been found to withstand the necessary high repetition rate of pulse current required for the instant operation. Lamp 2 is typically operated in a pulse mode for laser operation at 1.44 $\mu$m with an applied voltage of about 600 volts for a period of 1 millisecond and at a repetition rate of 30 to 100 pulses per second. Additionally, the above described krypton lamp 2 has been found to be adequate for operation with a continuous current of up to 50 amps for continuous operation at a wavelength of 1.06 $\mu$m. Although lamp 2 is preferably a krypton arc lamp, other light sources such as a tungsten lamp or other arc lamp shining continuously, or a Xenon flash lamp producing pulses of light may also be utilized.

Drive lamp 2, typically termed a "pump lamp", emits a broad spectrum of light, but neodymium ions, regardless of host, tend to absorb most strongly in a narrow range of wavelengths around 0.7 to 0.8 $\mu$m. Absorbing photons in this range raises the neodymium ions from the ground state to a high energy level, from which they decay to a metastable level which produces fluorescent emission at several wavelengths, namely 1.06 $\mu$m wavelength, 1.32 $\mu$m wavelength, and 1.44 $\mu$m wavelength. Laser action will occur on the 1.06 $\mu$m emission band, since the laser gain is highest for this wavelength, unless the laser mirrors or optics are made wavelength selective so as to suppress 1.06 $\mu$m laser oscillation.

Lamp 2 is driven by a d.c. power source 8 of conventional design which is connected to the driving electronics by lines 9 and 10. This d.c. power source provides a current of typically 10 amps to the drive lamp which is known in the laser art as a simmer current. The simmer current maintains the lamp 2 in a conducting state between current pulses. Lines 9 and 10 are connected to cables 11 and 12 respectively which in turn are connected at one of their ends to lamp 2 and at their other ends to a solid state switching circuit or "chopper" 13. The "chopper" circuit 13 drives lamp 2 at 600 volts with a typical current of 300 amps for 1 millisecond at a repetition frequency of 30 pulses per second to typically obtain an average power of 50 watts at 1.44 $\mu$m wavelength. Circuit 13 will also operate at a repetition rate of typically one kilohertz for continuous operation of lamp 2. Under continuous operation it is necessary to average the current flow by switching a smoothing filter into the circuit. For this purpose, the 1 khz pulse train from chopper circuit 13 is averaged by using a capacitor 14 having a rating of 0.009 Farads mounted in parallel to lamp 2. Additionally, a relay 15 switches the smoothing capacitor 14 into and out of the circuit depending upon whether one desires pulsed operation or continuous operation. For example, the average current for continuous operation is typically 45 amps developing 100 watts of laser output power at 1.06 $\mu$m wavelength. FIG. 1 also illustrates that lamp 2 is started in the usual manner by a triggering transformer 16 which is a standard series high voltage pulse transformer having its own independent driving electronics 17, which is standard practice.

Mirror carousel 5 is comprised of a sliding mirror mount containing two or more sets of laser mirrors 18, 18' and 19, 19', mounted in conventional laser mirror adjusting mechanisms 20, 21 respectively. Carousel 5 also includes a linking member 22 which interconnects adjusting mechanisms 20 and 21 so that each set of mirrors 18, 18' or 19, 19' move in tandem. Carousel 5 is driven between a first position wherein mirrors 18, 18' form a laser cavity with rod 1 to produce a 1.06 $\mu$m wavelength beam, and a second position wherein mirrors 19, 19' are adjacent the ends of rod 1 to produce a laser beam of 1.44 $\mu$m wavelength. As a means for driving carousel 5 between its alternate positions, FIG. 1 illustrates that adjusting mechanism 20 may be attached to a cable or other line 23 trained about a pair of sheaves 24 or 25 rotatably mounted on brackets 26 and 27, respectively, which in turn are mounted on a support member 28. As shown, sheave 24 is driven by an electric motor 31 to move carousel 5 upwardly or downwardly to properly locate either laser mirrors 18, 18' or 19, 19' adjacent the end of rod 1 to develop either 1.06 or 1.44 μm wavelength laser beams.

The mirrors used for achieving laser action at 1.44 μm must be reflecting at 1.44 μm but be as transparent as possible at 1.06 μm and 1.32 μm. For example, those mirrors used to achieve high average power at 1.44 μm with N=0.4 are preferably comprised of one mirror with 100% reflectivity at 1.44 μm, 50% reflectivity at 1.32 μm and 10% reflectivity at 1.06 μm, and another mirror with about 90% reflectivity at 1.44 μm, 20% reflectivity at 1.32 μm and 5% reflectivity at 1.06 μm. In addition, a transmitting silicon window 1 cm thick which is anti-reflection coated at 1.44 μm, may be placed adjacent to the laser rod and inside the laser resonator. Silicon is approximately 100% absorbing at 1.06 μm and serves to suppress laser oscillation at 1.06 μm wavelength. The addition of this element will suppress laser oscillation even if the laser mirrors are highly reflecting at 1.06 μm wavelength. Other elements such as prisms or diffraction gratings could be used for wavelength selection. Such mirrors mounted adjacent to the ends of laser rod 1 result in a laser output with an average power of up to 100 watts.

A quartz fiber 29 may also be utilized for transmitting the 1.44 μm laser beam. Fiber 29 is typically a 600 μm core quartz fiber. Even though quartz is known to have absorption caused by trapped water in the region of 1.44 μm, anhydrous quartz fiber is almost water free so that negligible absorption occurs resulting in the ability to transmit both the coagulating 1.06 μm beam and the cutting 1.44 μm through the same quartz fiber 29.

The laser beam from laser rod 1 is focused onto quartz fiber 29 by a lens 30. Lens 30 is antireflection coated at 1.06 and 1.44 μm and has a focal a length of approximately 2 centimeters, which is conventional.

ALTERNATIVE EMBODIMENTS

A person skilled in the art could make immaterial modifications to the invention described and claimed in this patent without departing from the essence of the invention.

I claim:

1. A long wavelength neodymium laser, comprising:
   a housing including a reflective hollow optical cavity;
   a laser rod mounted in said optical cavity, said laser rod composed of a crystalline or glass host structure having neodymium doping;
   a pump lamp mounted in said optical cavity adjacent to said laser rod, said pump lamp providing a source of light for transfer to said laser rod;
   drive means including circuit means for driving said pump lamp to produce intermittent pulses of light from said pump lamp;
   wavelength selective resonator means for providing maximum reflection at 1.4 to 1.5 μm wavelength and minimum reflection at other wavelengths to allow laser oscillation in the range 1.4 to 1.5 μm; and
   the laser rod having a neodymium concentration level of between about 0.3 and 0.7N.

2. The long wavelength neodymium laser of claim 1 in which the neodymium concentration is about 0.4N and the wavelength selective resonator means includes a mirror having reflectivity of about 90% at 1.44 μm.

* * * * *